(12) United States Patent
Matsuoka

(10) Patent No.: US 11,531,222 B2
(45) Date of Patent: Dec. 20, 2022

(54) DISPLAY DEVICE AND METHOD FOR MANUFACTURING DISPLAY DEVICE

(71) Applicant: DENSO CORPORATION, Kariya (JP)

(72) Inventor: Kimihiro Matsuoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/399,697

(22) Filed: Aug. 11, 2021

(65) Prior Publication Data

US 2021/0373381 A1 Dec. 2, 2021

Related U.S. Application Data

(63) Continuation of application No. PCT/JP2020/000829, filed on Jan. 14, 2020.

(30) Foreign Application Priority Data

Feb. 20, 2019 (JP) .............................. JP2019-028180

(51) Int. Cl.
*G02F 1/1333* (2006.01)
*H01L 51/52* (2006.01)

(52) U.S. Cl.
CPC .... *G02F 1/133314* (2021.01); *G02F 1/13332* (2021.01); *G02F 1/133325* (2021.01); *H01L 51/5237* (2013.01); *G02F 1/133331* (2021.01); *G02F 2202/28* (2013.01)

(58) Field of Classification Search
None
See application file for complete search history.

(56) References Cited

U.S. PATENT DOCUMENTS

| | | |
|---|---|---|
| 2009/0073342 A1 | 3/2009 | Jung et al. |
| 2012/0170244 A1 | 7/2012 | Kwon et al. |
| 2014/0192495 A1 | 7/2014 | Yajima |
| 2015/0070602 A1 | 3/2015 | Fujita |
| 2018/0113352 A1 | 4/2018 | Arita |
| 2020/0400995 A1* | 12/2020 | Zhou ...................... G02B 6/009 |
| 2021/0096424 A1* | 4/2021 | Hsu ................... G02F 1/133317 |

FOREIGN PATENT DOCUMENTS

| | | |
|---|---|---|
| JP | 200969792 A | 4/2009 |
| JP | 2011209470 A | 10/2011 |
| JP | 2014134653 A | 7/2014 |
| JP | 2015072447 A | 4/2015 |
| JP | 2015230402 A | 12/2015 |
| JP | 2016118622 A | 6/2016 |
| JP | 2018072463 A | 5/2018 |
| JP | 2018194674 A | 12/2018 |

* cited by examiner

*Primary Examiner* — Richard H Kim
(74) *Attorney, Agent, or Firm* — Harness, Dickey & Pierce, P.L.C.

(57) ABSTRACT

A display device includes a display unit having a display surface to display an image, a cover panel stacked on the display surface of the display unit, and a holding frame stacked on a back surface of the display unit. The display surface of the display unit and the cover panel are bonded to each other with an optical adhesive material. The holding frame and the display unit are bonded to each other with a variable thickness adhesive material a thickness of which is variable at least at a time of bonding the holding frame and the display unit.

7 Claims, 13 Drawing Sheets

DISPLAY DEVICE AND METHOD FOR MANUFACTURING DISPLAY DEVICE

CROSS REFERENCE TO RELATED APPLICATIONS

The present application is a continuation application of International Patent Application No. PCT/JP2020/000829 filed on Jan. 14, 2020, which designated the U.S. and claims the benefit of priority from Japanese Patent Application No. 2019-028180 filed on Feb. 20, 2019. The entire disclosures of all of the above applications are incorporated herein by reference.

TECHNICAL FIELD

The present disclosure relates to a display device and a method for manufacturing a display device.

BACKGROUND

It is known a display device having a display unit for displaying an image and a panel disposed on a surface of the display unit, and in which the panel and the display unit are joined by optical-bonding.

SUMMARY

The present disclosure describes a display device including a display unit having a display surface to display an image, a cover panel stacked adjacent to the display surface of the display unit, and a holding frame stacked on a back surface of the display unit to hold the display unit. The display surface of the display unit and the cover panel are bonded to each other with an optical adhesive material. The holding frame and the display unit are bonded to each other with a variable thickness adhesive material a thickness of which is variable at least at a time of bonding the holding frame and the display unit.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
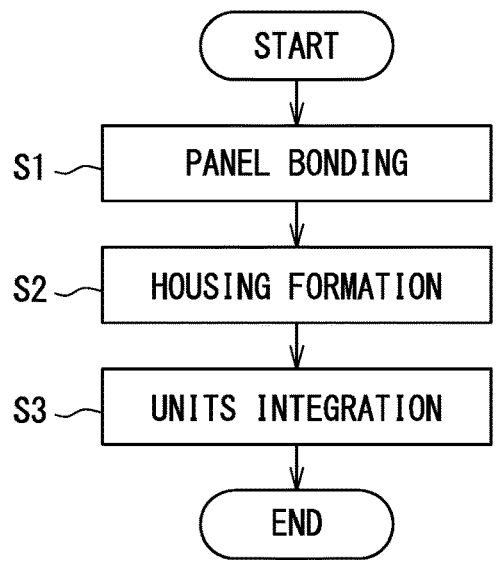
FIG. 1 is a diagram showing a manufacturing process of a display device.

In a display device in which a display unit is adhered to a panel with a transparent adhesive member used for optical-bonding, the display unit may not be fixed to other members, such as a case. However, the weight of the display unit tends to increase due to the increase in the size of a display screen. In such a case, it may be preferable that the display unit is supported not only by the panel but also by a housing.

In the case of a structure in which the display unit is supported by a housing, when stress is generated in the display unit or the housing, the portion bonded by optical-bonding may be displaced due to the stress, and display unevenness may occur. Further, it is necessary not only to suppress the display unevenness but also to restrict foreign matter from entering, in order to improve the yield.

The present disclosure provides a display device capable of improving the yield while suppressing display unevenness, and a method for manufacturing a display device.

According to an aspect of the present disclosure, a display device includes a display unit for displaying an image on a display surface, a cover panel stacked on the display surface of the display unit, and a holding frame stacked on a back surface of the display unit to hold the display unit. The display surface of the display unit and the cover panel are bonded to each other with an optical adhesive material, and the holding frame and the display unit are bonded to each other with a variable thickness adhesive material whose thickness is variable at least at the time of bonding.

In the display device described above, the holding frame and the display unit are bonded to each other with the variable thickness adhesive material. Therefore, the stress applied from the holding frame to the display unit at the time of bonding can be reduced, as compared with a case where the holding frame and the display unit are connected to each other by screws. As a result, even if the display unit and the cover panel are bonded to each other with the optical adhesive material before the display unit and the holding frame are bonded to each other, a stress in the display unit can be reduced when the display unit and the holding frame are bonded to each other, and displacement of the optical adhesive material will not occur. Accordingly, an occurrence of display unevenness can be suppressed.

Further, the display unit and the cover panel can be first bonded to each other with the optical adhesive material before bonding the display unit and the holding frame. Therefore, as compared with the case where the display unit and the cover panel are bonded to each other after the display unit and the holding frame are connected to each other, there is less fear that foreign matter will enter between the display unit and the cover panel, resulting in the improvement of the yield.

According to an aspect of the present disclosure, a method for manufacturing a display device includes a panel bonding step, a housing forming step, and a unit integration step. In the panel bonding step, a display surface of a display unit for displaying an image and a cover panel are bonded to each other with an optical adhesive material, to thereby form a panel-bonded display unit. In the housing forming step, a holding frame for holding the display unit and a design frame for covering a side surface of the display unit are connected to each other, to thereby form a housing unit. In the unit integration step, the housing unit and the panel-bonded display unit are bonded to each other with a variable thickness adhesive material whose thickness is variable at least at the time of bonding.

Since the panel-bonded display unit is produced, it is possible to check whether the cover panel and the display unit are bonded to each other without unevenness and foreign matters are not mixed in the state of the panel-bonded display unit, before the display device is completely fabricated. Therefore, the deterioration of the yield can be suppressed.

Further, since the design frame and the holding frame are connected to each other to form the housing unit, even if the design frame alone has low rigidity and has a possibility of deformation, the deformation of the design frame can be corrected as being connected to the holding frame before the design frame is connected to the panel-bonded display unit. As a result, when the housing unit and the panel-bonded display unit are bonded to each other, the force applied from the design frame to the panel-bonded display unit is reduced.

Further, since the housing unit and the panel-bonded display unit are bonded to each other with the thickness variable adhesive material, the force applied from the housing unit to the panel-bonded display unit is also reduced. As a result, the force that causes to displace the optical adhesive material is reduced. Therefore, an occurrence of display unevenness can be suppressed.

Figure 11:
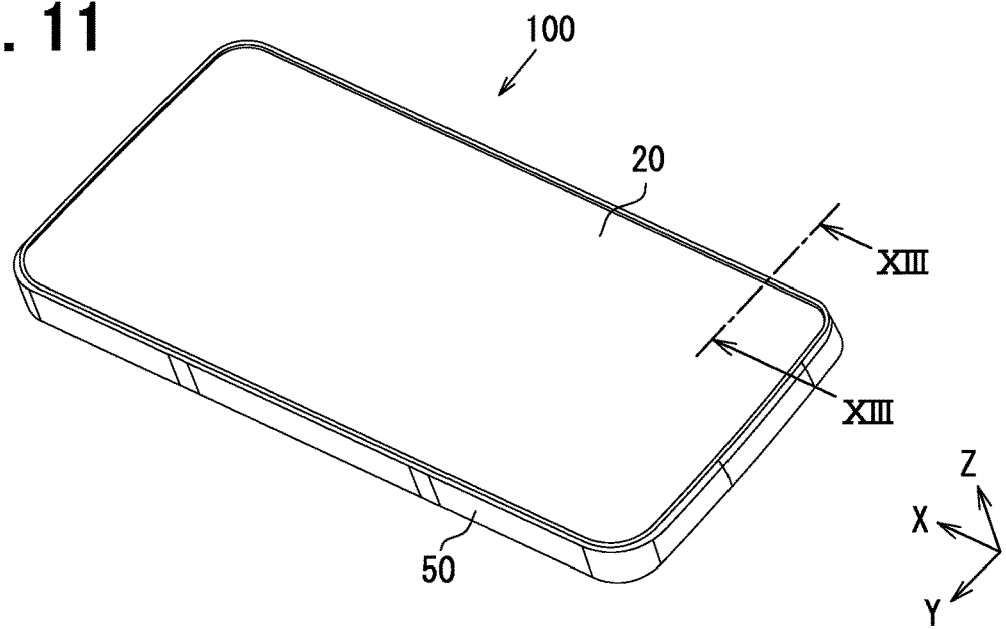
FIG. 11 is a diagram illustrating a perspective view of the display device.
Figure 12:
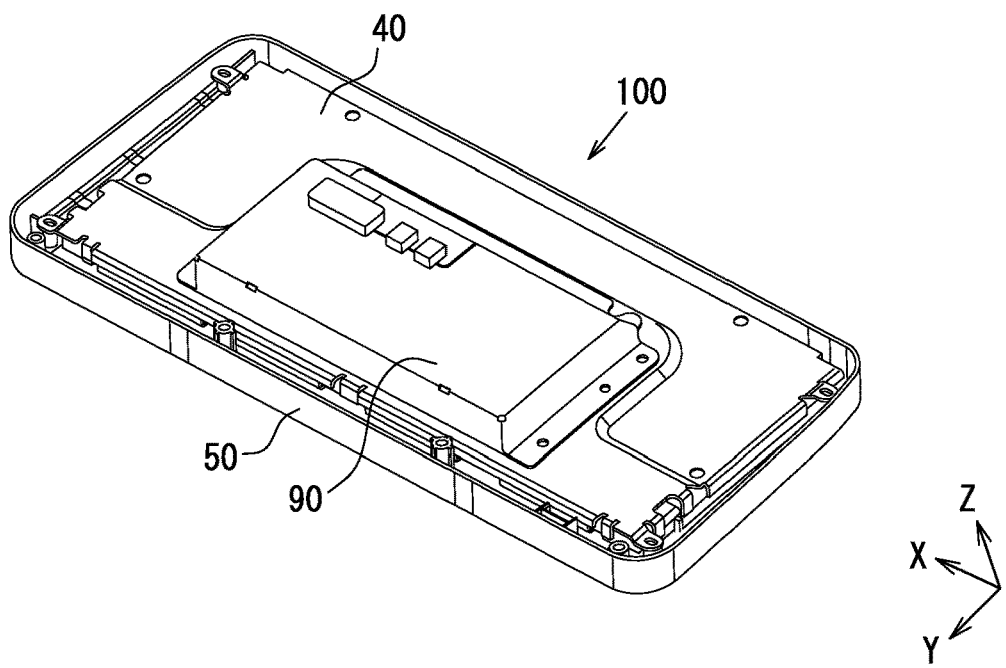
FIG. 12 is a diagram illustrating a perspective view of the display unit, when viewed from a back surface.

Hereinafter, embodiments of the present disclosure will be described with reference to the drawings. FIGS. 11 and 12 show the completed product of a display device 100 of an embodiment. FIG. 1 shows a process for manufacturing the display device 100. The display device 100 is produced through steps shown in FIG. 1. FIGS. 2 to 10 are diagrams for explaining the work in each step shown in FIG. 1.

As shown in FIG. 1, the manufacturing process for the display device 100 includes a panel bonding step S1 and a housing forming step S2. In FIG. 1, the housing forming step S2 is shown after the panel bonding step S1, but the panel bonding step S1 and the housing forming step S2 are not related to each other. Therefore, the panel bonding step S1 and the housing forming step S2 may be simultaneously performed in parallel. Alternatively, the panel bonding step S1 may be performed after the housing forming step S2 is performed.

Panel Bonding Step S1

Figure 2:
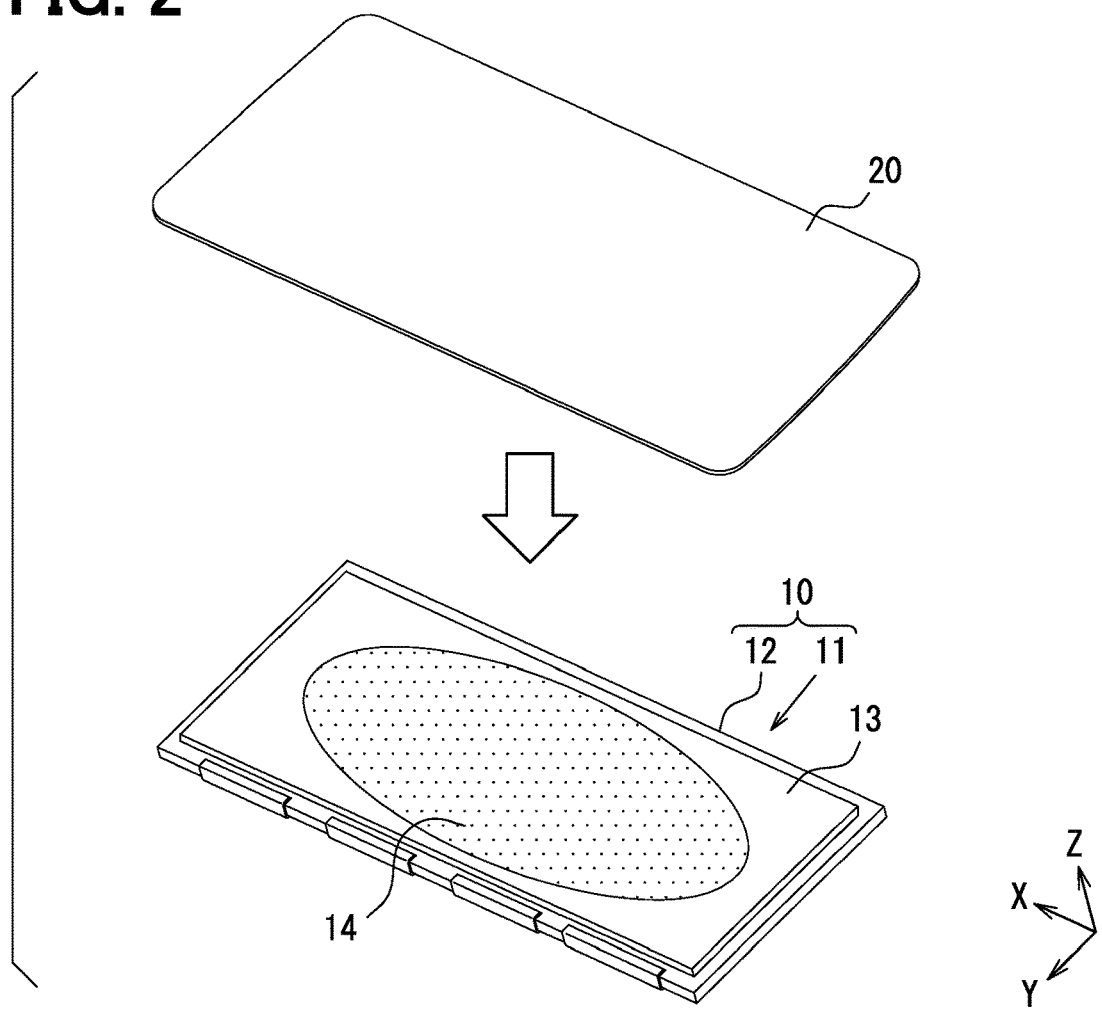
FIG. 2 is a diagram for explaining a panel bonding step.

FIG. 2 is a diagram for explaining the panel bonding step S1. FIG. 2 shows a display unit 10 and a cover panel 20. The display unit 10 of the present embodiment has a configuration in which a liquid crystal panel 11 is held by a metal panel frame 12. The liquid crystal panel 11 has a structure in which a liquid crystal element, a color filter, a backlight, and the like are stacked. The liquid crystal panel 11 may further include a control board. The liquid crystal panel 11 has a display surface 13, and an image is displayed on the display surface 13.

The cover panel 20 is stacked on the display unit 10 adjacent to the display surface 13 of the liquid crystal panel 11 in order to protect the display unit 10. The cover panel 20 has a property of allowing light to transmit. The cover panel 20 is made of a transparent resin or transparent glass, for example.

In the panel bonding step S1, the cover panel 20 and the display unit 10 are bonded to each other by optical-bonding. FIG. 2 shows a state in which an optical adhesive 14, which is an example of an optical adhesive material used for optical-bonding, is deposited on the display surface 13. The optical adhesive 14 is also referred to as an optical clear resin (OCR). There are several known types of the optical adhesive 14, such as acrylic type and silicon type. Any type of optical adhesive 14 may be used. As the optical adhesive material used for the optical-bonding, an optical tape may be used, other than the optical adhesive 14. The optical tape is also referred to as an optical clear adhesive (OCA). There are several known types of the optical tape such as acrylic type, silicon type, and urethane type. Any type of the optical tape may be used as the optical adhesive material.

Figure 3:
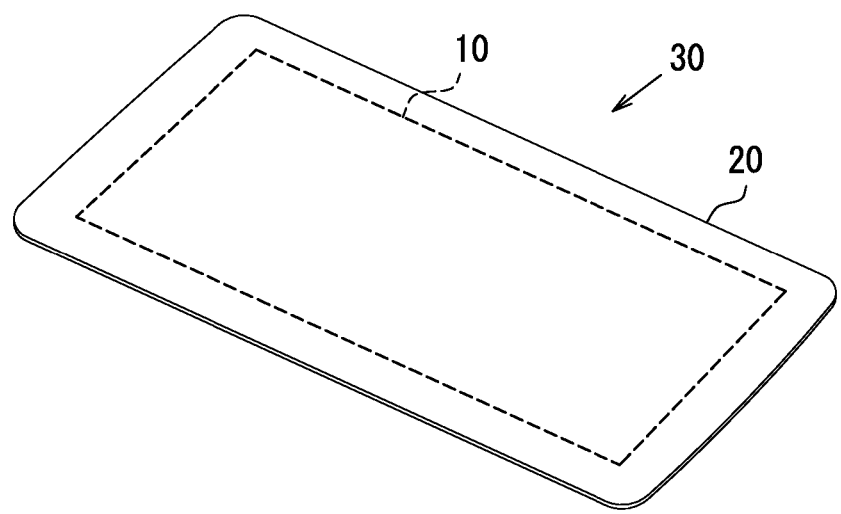
FIG. 3 is a diagram showing a perspective view of a panel-bonded display unit.
Figure 4:
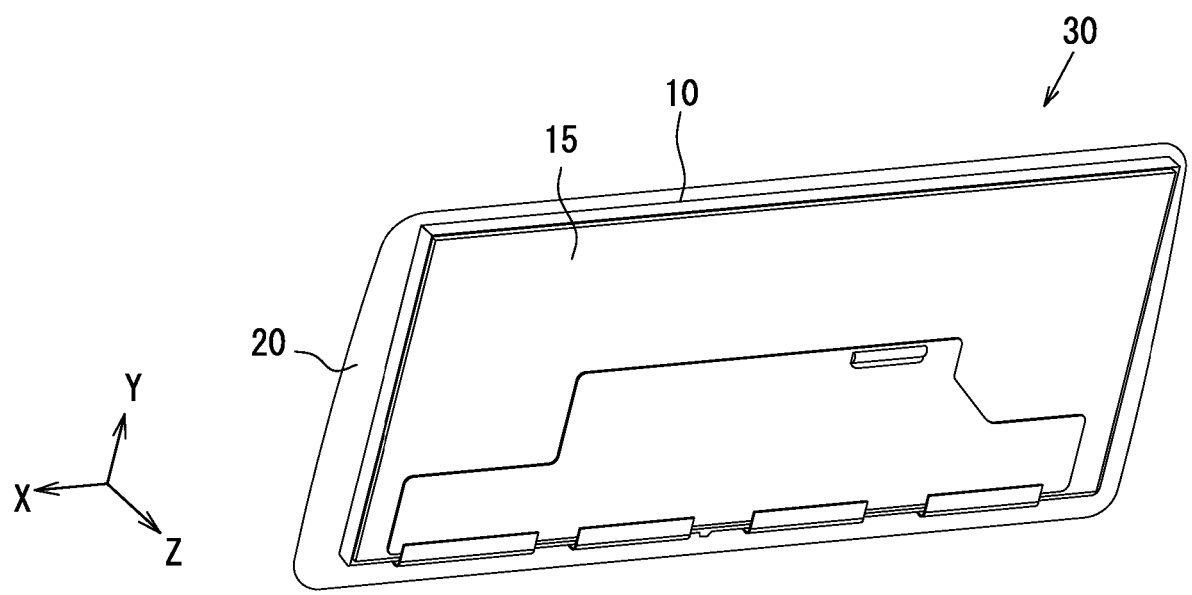
FIG. 4 is a diagram showing a perspective view of the panel-bonded display unit, when viewed from a display unit side.

When the display unit 10 and the cover panel 20 shown in FIG. 2 are overlaid on top of another, a panel-bonded display unit 30 shown in FIG. 3 is produced. FIG. 4 is a perspective view of the panel-bonded display unit 30, when viewed from the display unit 10 side. As shown in FIGS. 3 and 4, the cover panel 20 has a longer length and width than the display unit 10. Therefore, when the panel-bonded display unit 30 is viewed from the display unit 10 side as shown in FIG. 4, the cover panel 20 has a portion exposed from the display unit 10.

Housing Forming Step S2

Figure 5:
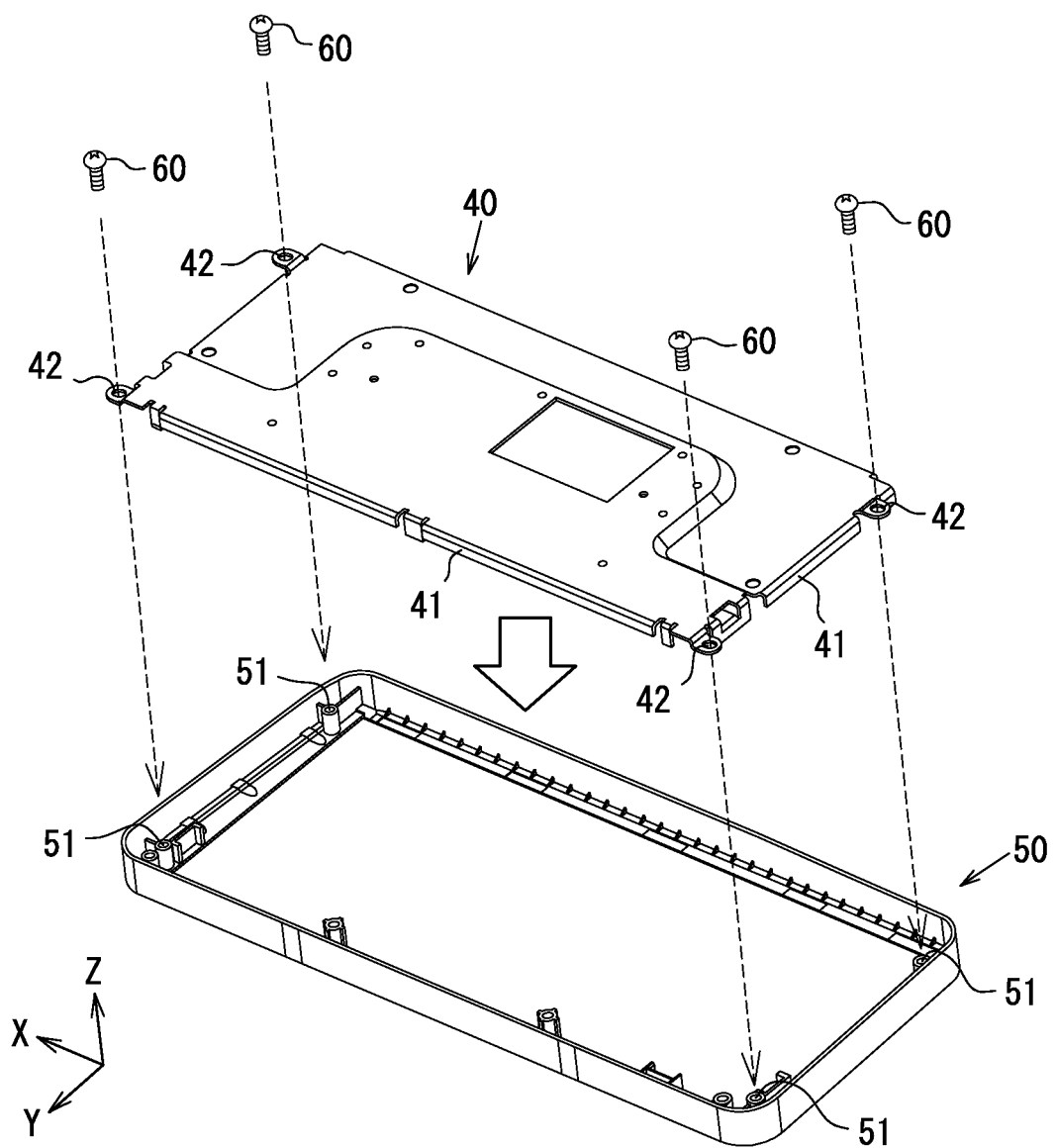
FIG. 5 is a diagram for explaining a housing forming step.

Next, a housing forming step S2 will be described. FIG. 5 is a diagram for explaining a housing forming step S2. In the housing forming step S2, a holding frame 40 and a design frame 50 are connected to each other. The holding frame 40 is a member that holds a back surface of the display unit 10. The back surface of the display unit 10 is a surface opposite to the display surface 13. The holding frame 40 needs to hold the display unit 10 so that the display unit 10 is not deformed.

Therefore, the holding frame 40 is preferably made of a metal. This is because the holding frame 40 made of a metal has a high strength. The holding frame 40 may be made of, for example, a galvanized steel plate. The holding frame 40 may be provided by an aluminum alloy molded product or a magnesium alloy molded product.

The holding frame 40 has substantially the same shape as the display unit 10 in a plan view, that is, when viewed in a direction normal to the display surface 13 of the display unit 10. The holding frame 40 has a rectangular shape in the plan view. The holding frame 40 partially has projections or recesses and an aperture, but has a thin plate shape as a whole. The end of the holding frame 40 is bent so as to form a flat plate-shaped bent portion 41.

The design frame 50 is a rectangular frame shape and is a member that covers the side surface of the display unit 10. The design frame 50 is generally made of a resin in order to increase the degree of freedom in design, but may be made of a metal.

In the present embodiment, screw 60 are used to connect the holding frame 40 and the design frame 50 to each other.

The holding frame 40 is formed with through holes 42 to allow the screws 60 to pass through. Further, the design frame 50 is formed with screw holes 51 into which the screws 60 are fitted.

Figure 6:
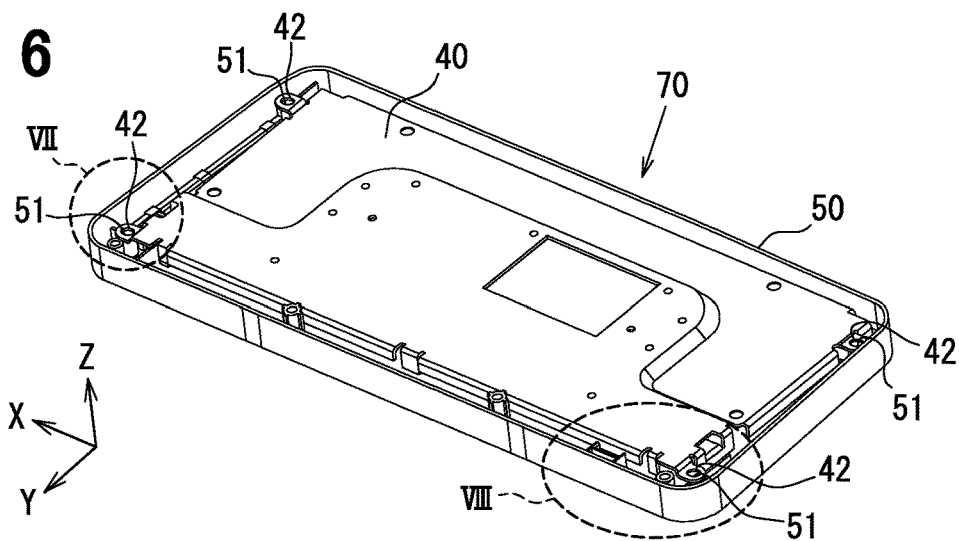
FIG. 6 is a diagram showing a perspective view of a housing unit.
Figure 7:
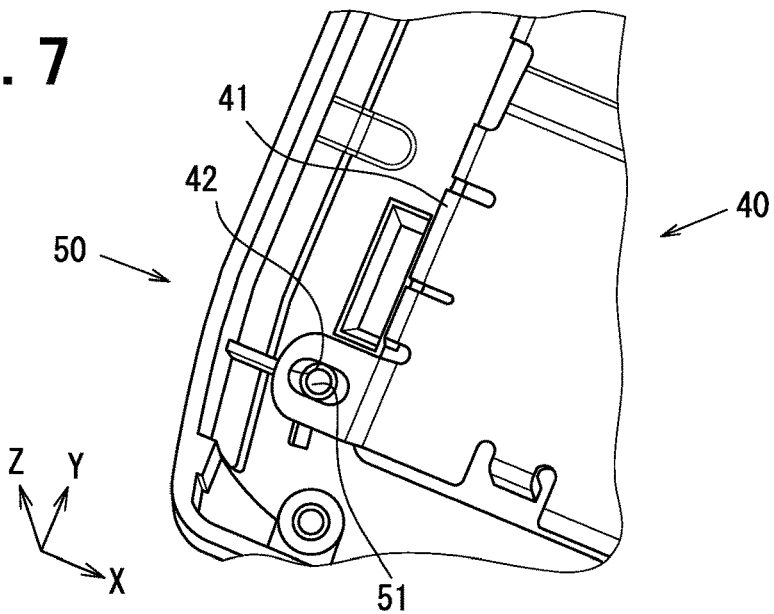
FIG. 7 is an enlarged view of a part VII in FIG. 6.

FIG. 6 shows the design frame 50 and the holding frame 40 connected to each other. FIG. 7 is an enlarged view of a part VII in FIG. 6. As shown in FIG. 7, when the flat bent portion 41 comes into contact with an inner peripheral edge of the design frame 50, the relative position between the holding frame 40 and the design frame 50 in an X direction is determined.

Figure 8:
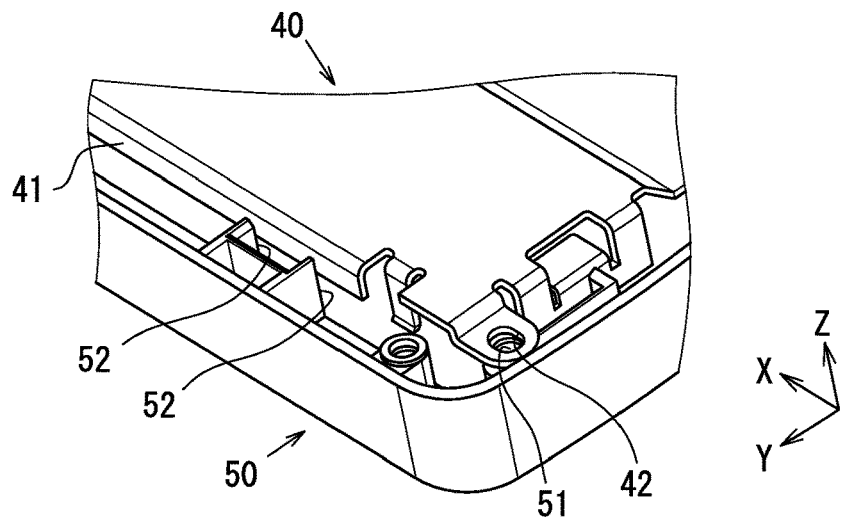
FIG. 8 is an enlarged view of a part VIII in FIG. 6.

FIG. 8 is an enlarged view of a part VIII in FIG. 6. The design frame 50 is formed with a rib 52. The rib 52 is used not only for the purpose of improving the strength of the design frame 50 but also for positioning the holding frame 40. As shown in FIG. 8, the flat bent portion 41 of the holding frame 40 is in contact with the rib 52 of the design frame 50. As a result, the relative position between the holding frame 40 and the design frame 50 in a Y direction is determined.

The bent portions 41 of the holding frame 40 are brought into contact with the rib 52 and the inner peripheral edge of the design frame 50. As a result, the relative position between the holding frame 40 and the design frame 50 is determined. In this state, by turning the screws 60, which have been passed through the through holes 42, into the screw holes 51, the holding frame 40 and the design frame 50 are connected to each other, thereby to produce a housing unit 70.

Unit Integration Step S3

Next, a unit integration step S3 will be described. In the unit integration step S3, the panel-bonded display unit 30 and the housing unit 70 are integrated with each other. The panel-bonded display unit 30 and the housing unit 70 are integrated with each other by adhesion.

Figure 9:
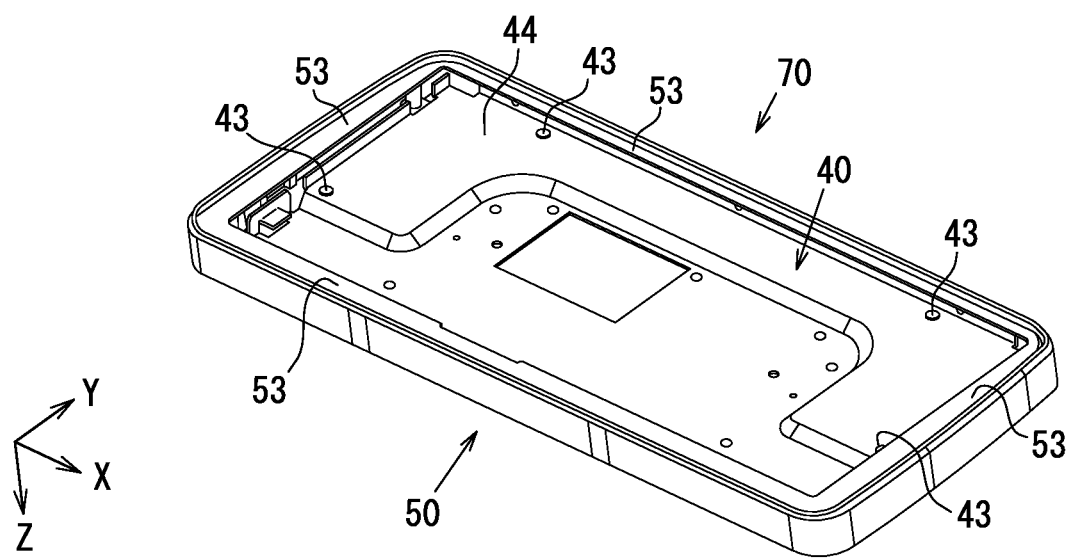
FIG. 9 is a diagram showing a perspective view of the housing unit, when viewed from the opposite side to FIG. 6.

FIG. 9 is a view of the housing unit 70 in a state where the housing unit 70 is turned upside down from the state shown in FIG. 6. As shown in FIG. 9, the holding frame 40 is formed with protrusions 43, as an example of a projection portion. The holding frame 40 has a plurality of protrusions 43, specifically, four protrusions 43. The holding frame 40 has an adhesive surface 44, which is a flat surface portion, and the protrusions 43 protrude from the adhesive surface 44. The adhesive surface 44 is a surface to which an adhesive agent 80 (see FIG. 10) is applied in order to bond the housing unit 70 and the panel bonded display unit 30 to each other. Instead of the adhesive agent 80, an elastic double-sided adhesive tape may be adhered to the adhesive surface 44. The elastic double-sided adhesive tape is a double-sided tape in which an adhesive is applied to both sides of an elastic base material such as a non-woven fabric or a sponge. The elastic double-sided adhesive tape is, for example, a double-sided tape using an acrylic foam.

Figure 10:
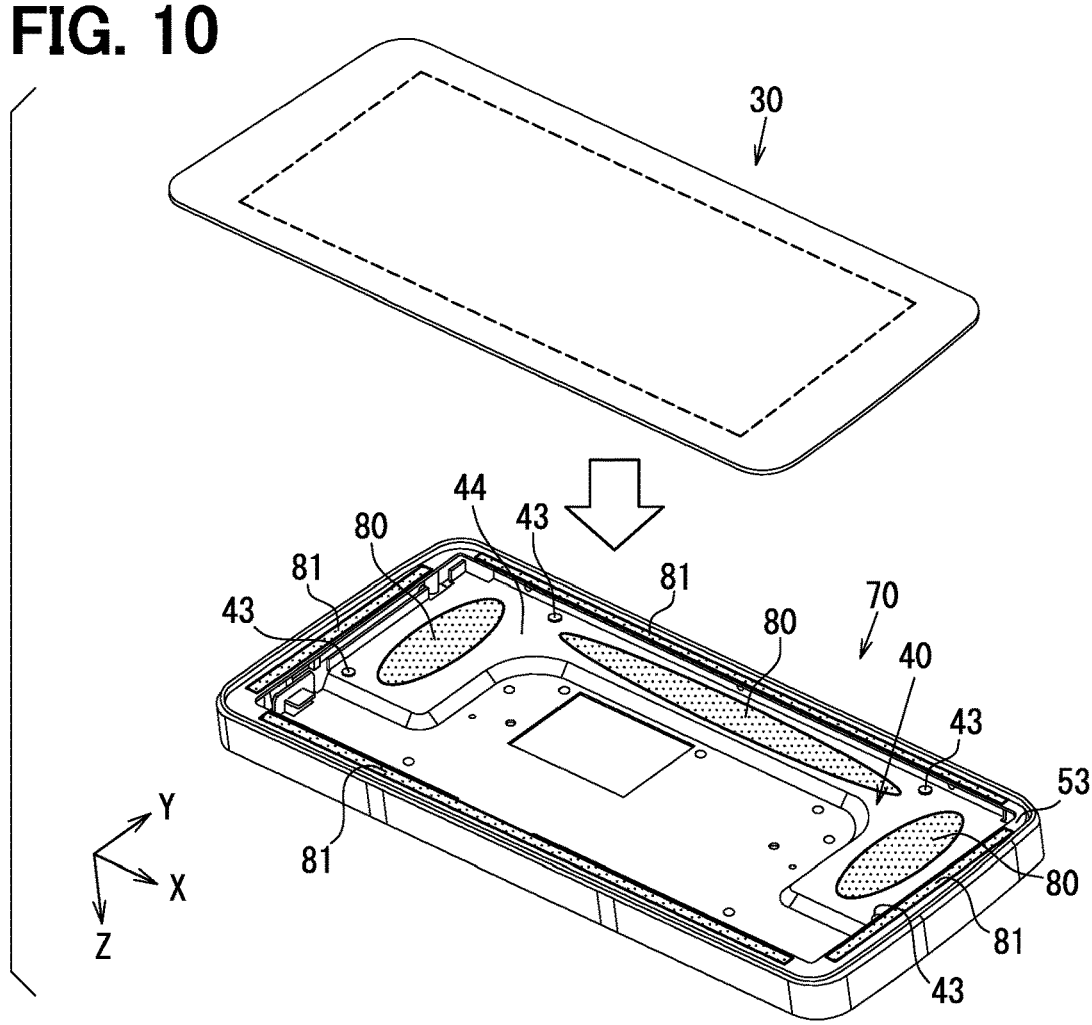
FIG. 10 is a diagram for explaining a unit integration step.

FIG. 10 is a diagram for explaining the unit integration step S3. In the holding frame 40 shown in FIG. 10, the adhesive agent 80 has been applied to the adhesive surface 44. More specifically, the adhesive agent 80 is applied in an area between the protrusions 43. The protrusions 43 are provided for easily determining whether or not the amount of the adhesive agent 80 applied to the adhesive surface 44 is appropriate. The height of the protrusion 43 from the adhesive surface 44 indicates an appropriate thickness for applying the adhesive agent 80. If the amount of the adhesive agent 80 is too small, the adhesive force between the housing unit 70 and the panel-bonded display unit 30 will not be sufficient. Further, if the amount of the adhesive agent 80 is too much, the adhesive agent 80 will overflow to an unnecessary area, which is not preferable.

In the present embodiment, on the other hand, a worker may apply the adhesive agent 80 to the area between the protrusions 43 so that the adhesive agent 80 becomes higher than the protrusions 43 while remaining a room for the adhesive agent 80 to spread in the area between the protrusions 43 as shown in FIG. 10. As a result, the adhesive agent 80 can be easily deposited with an appropriate application thickness. The portion of the adhesive agent 80 which is higher than the protrusions 43 is crushed by the panel-bonded display unit 30, so that the application thickness of the adhesive agent 80 becomes the same as the height of the protrusions 43. As the portion of the adhesive agent 80 is crushed, the adhesive agent 80 spreads in a direction along the adhesive surface 44.

The adhesive agent 80 is a liquid. Since the liquid adhesive agent 80 is used, the thickness of the adhesive agent 80 changes due to an external force such as a gravity acting before being dried. Therefore, the adhesive agent 80 can be referred to as a variable thickness adhesive material. An elastic double-sided adhesive tape that can be used instead of the adhesive agent 80 is also the variable thickness adhesive material. The kind of adhesive agent 80 to be used is determined depending on the material of the holding frame 40 and the material of the adhesive surface 15 of the display unit 10 shown in FIG. 4. An elastic adhesive can be used as the adhesive agent 80. In a case where the adhesive agent 80 is provided by an elastic adhesive, the adhesive agent 80 has elasticity even after the adhesive agent 80 is cured. The elastic adhesive is preferably an adhesive that maintains adhesiveness and elasticity in a temperature range in use. As the elastic adhesive, various materials such as one containing silicon rubber as a main component, one containing polyurethane as a main component, one containing rubber as a main component, and one containing acrylic monomer as a main component may be used.

In the unit integration step S3, as shown in FIG. 10, an elastic adhesive tape 81 is attached to a panel facing surface 53 of the design frame 50. The elastic adhesive tape 81 has adhesiveness on both sides. The panel facing surface 53 is an end surface of the design frame 50 facing the peripheral edge portion of the cover panel 20. The design frame 50 and the cover panel 20 may be adhered to each other with an adhesive, in place of the elastic adhesive tape 81. The adhesive used for adhering the design frame 50 and the cover panel 20 is determined in consideration of the material of the design frame 50 and the material of the cover panel 20. The elastic adhesive tape 81 or the adhesive used in place of the elastic adhesive tape 81 also serves as the variable thickness adhesive material.

In the state shown in FIG. 10, the housing unit 70 is placed under the panel-bonded display unit 30. From this state, the panel-bonded display unit 30 is moved down toward the housing unit 70 to be fitted in the design frame 50, so that the side surface of the display unit 10 is covered by the design frame 50.

As a result, the display device 100 shown in FIG. 11 is produced. FIG. 12 is a backside view of the display device 100, when viewed from the back surface. The display device 100 shown in FIG. 12 is in a state in which a back case 90 that protects the control board or the like is attached.

Figure 13:
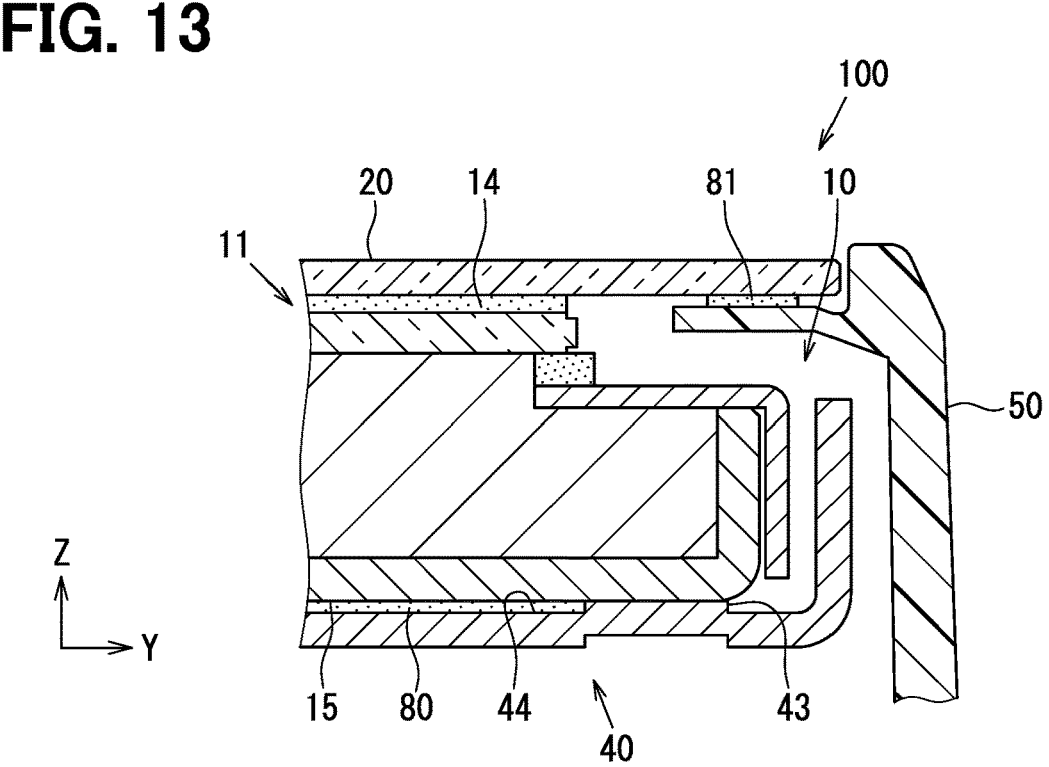
FIG. 13 is a diagram illustrating a cross-sectional view taken along line XIII-XIII in FIG. 11.

FIG. 13 is a cross-sectional view taken along line XIII-XIII in FIG. 11. The adhesive surface 15 of the display unit 10 and the protrusion 43 of the holding frame 40 are in contact with each other. The distance between the adhesive surface 44 of the holding frame 40 and the adhesive surface 15 of the display unit 10 is determined by the height of the protrusion 43 protruding from the adhesive surface 44.

It is assumed that, in a state where the adhesive agent 80 is applied to the adhesive surface 44 of the holding frame 40, the shape of the adhesive agent 80 is convex and the height of the adhesive agent 80 to its top is higher than the height of the protrusion 43. In this case, in the unit integration step S3, when the display unit 10 is moved down from the top, the adhesive agent 80 is crushed by the weight of the display unit 10, and the shape of the top surface of the adhesive agent 80 follows the shape of the adhesive surface 15 of the display unit 10. It is preferable that the adhesive agent 80 has the shape corresponding to the adhesive surface 15 of the display unit 10 as being pressed by the adhesive surface 15 of the display unit 10 due to the weight of the display unit 10. Therefore, it is preferable that the adhesive agent 80 has a high viscosity so that the adhesive agent 80 can retain the convex shape with the thickness to be higher than the protrusion 43 when being applied on the adhesive surface 44 and until being pressed by the panel-bonded display unit 30 due to the weight of the panel-bonded display unit 30.

In addition to that the shape of the top surface of the adhesive agent 80 is made to be along the shape of the adhesive surface 15 of the display unit 10, the cover panel 20 is also adhered to the elastic adhesive tape 81 due to the weight of the panel-bonded display unit 30. Therefore, in the unit integration step S3, the display unit 10 and the holding frame 40 are adhered to each other, and the cover panel 20 and the design frame 50 are also adhered to each other, by simply lowering the panel-bonded display unit 30 by its own weight.

First Comparative Example

Next, a comparative example will be described. In the following description of the comparative example, elements indicated with the same reference numbers as those in the embodiment described above are the same elements as those in the embodiment described above, unless otherwise specified.

Figure 14:
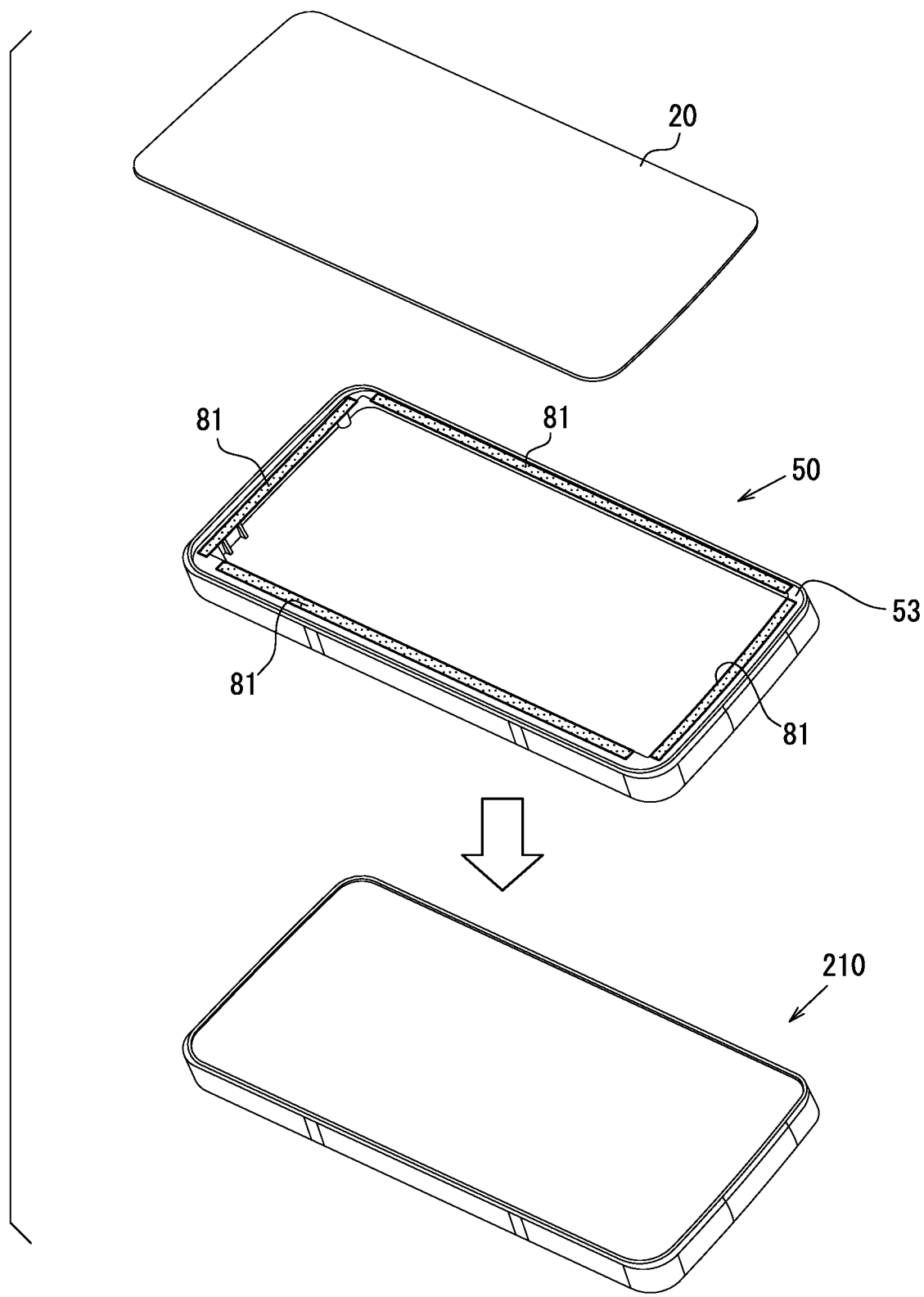
FIG. 14 is a diagram for explaining an assembling step of a design unit as a first comparative example.

In a first comparative example, a design unit 210 shown in FIG. 14 is produced. In the design unit 210, the elastic adhesive tape 81 is attached to the panel facing surface 53 of the design frame 50, and the design frame 50 and the cover panel 20 are integrated to each other.

Figure 15:
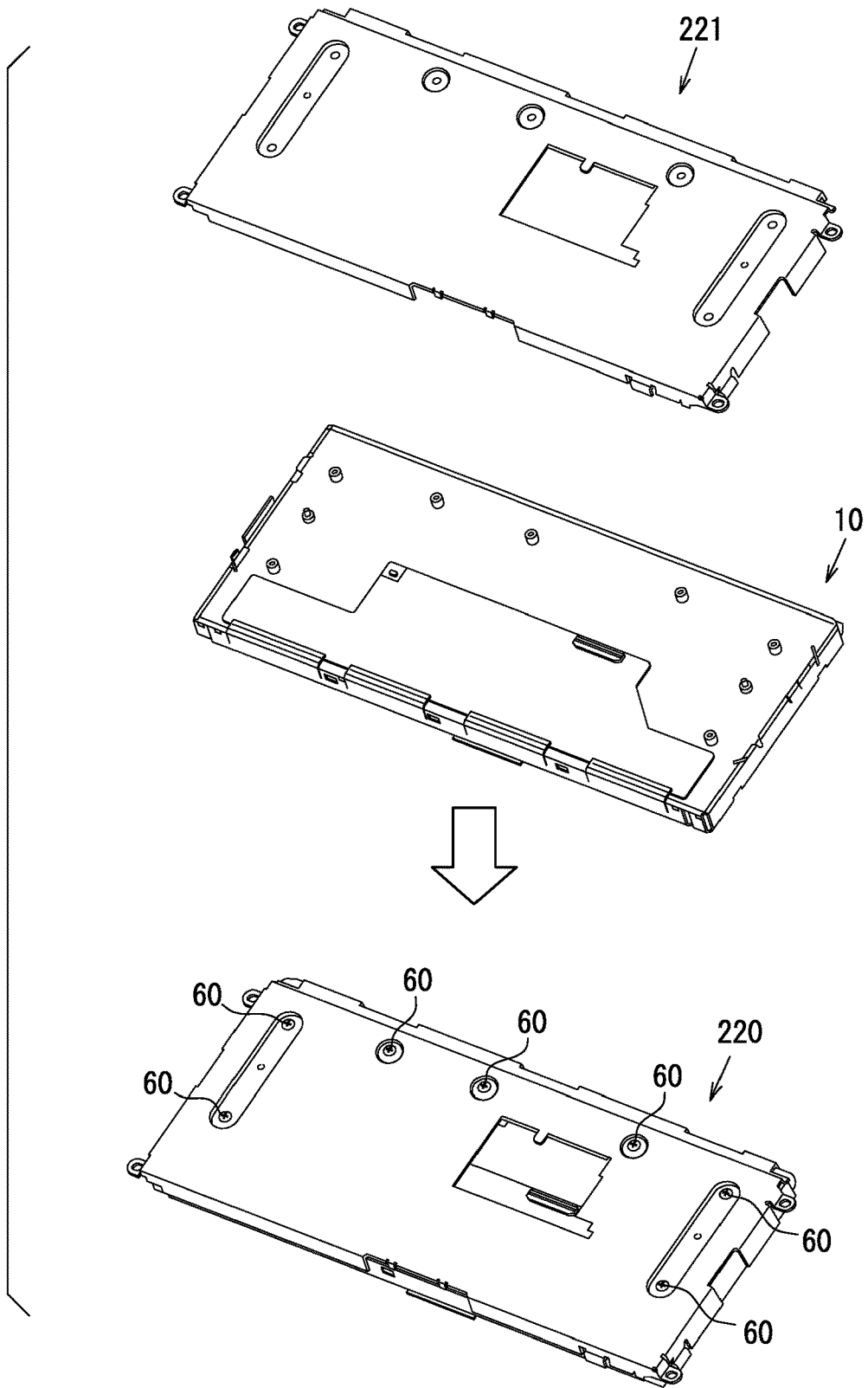
FIG. 15 is a diagram for explaining an assembling step of a frame-connected display unit as the first comparative example.

Separately from the design unit 210, a frame-connected display unit 220 shown in FIG. 15 is produced. The frame-connected display unit 220 is a combination of a holding frame 221 and the display unit 10. The holding frame 221 holds the display unit 10 as the holding frame 40 of the embodiment described above. The difference between the holding frame 221 of the first comparative example and the holding frame 40 of the embodiment described above is that the holding frame 221 of the first comparative example is not provided with the protrusions 43. Further, in the embodiment described above, the holding frame 40 and the display unit 10 are adhered to each other with the adhesive agent 80. In the first comparative example, on the other hand, the holding frame 221 and the display unit 10 are integrated to each other by screws 60.

Figure 16:
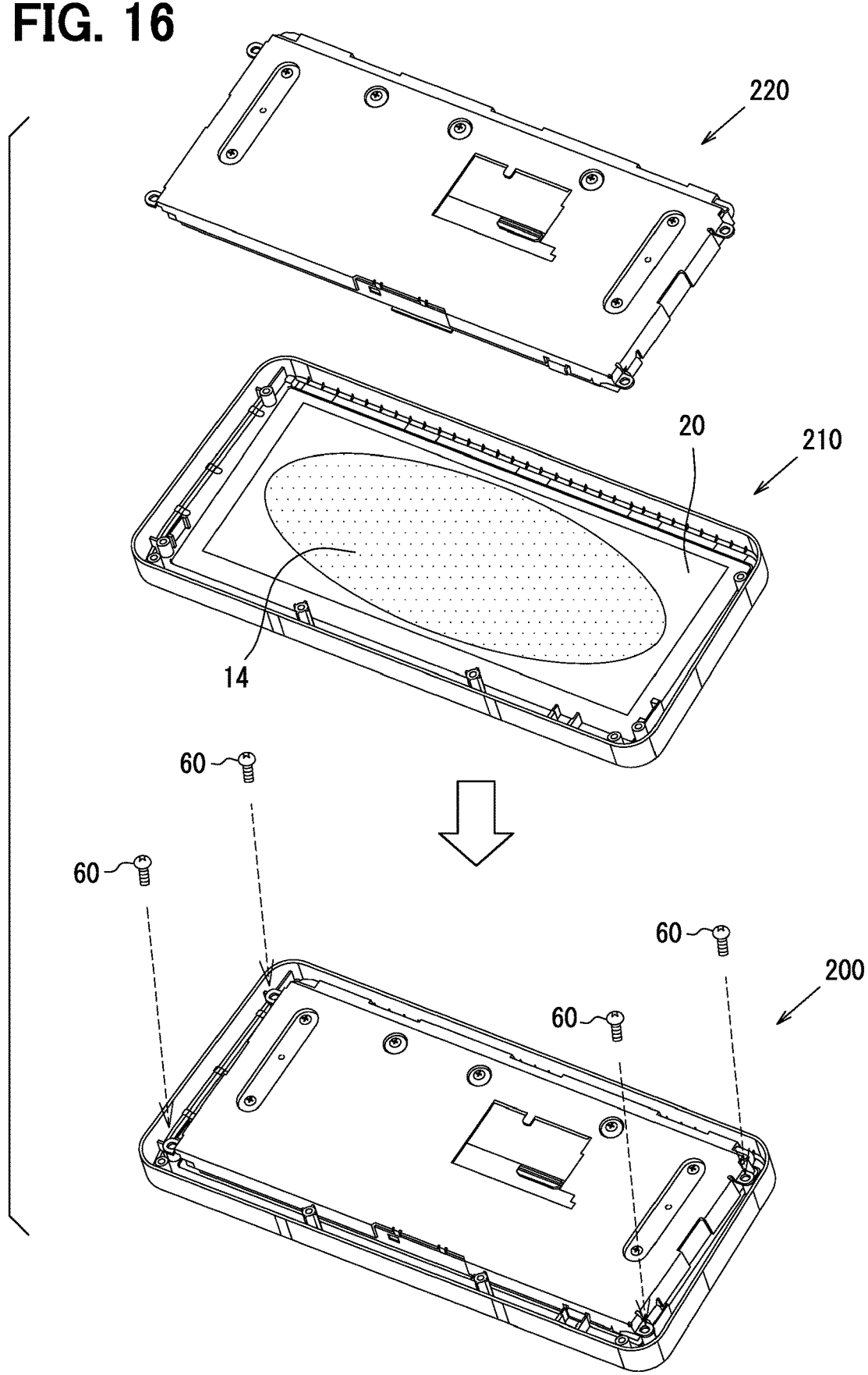
FIG. 16 is a diagram for explaining a completing step of the display device in the first comparative example.

After producing the design unit 210 and the frame-connected display unit 220, respectively, the optical adhesive 14 is applied to the cover panel 20 which is a part of the design unit 210, as shown in FIG. 16. Then, the design unit 210 and the frame-connected display unit 220 are connected to each other by the screws 60. In this way, the display device 200 is completed.

In the assembling method shown in the first comparative example, the holding frame 221 and the display unit 10 are integrated to each other by the screws 60. The step of bonding the cover panel 20 and the display unit 10 by the optical-bonding using the optical adhesive 14 is performed at the same time as the step of connecting the frame-connected display unit 220 and the design unit 210. Namely, the frame-connected display unit 220 and the design unit 210 are connected to each other before the optical adhesive 14 is cured. Therefore, if there is a relative strain between the frame-connected display unit 220 and the design unit 210, the optical adhesive 14 before curing has a thickness corresponding to the strain, so that the stress generated in the cover panel 20 is reduced. As such, display unevenness due to the displacement of the cover panel 20 and the resulting stress on the optical adhesive 14 is unlikely to occur.

Problem 1 of First Comparative Example

However, in the first comparative example, the display unit 10 is a member of the frame-connected display unit 220, while the cover panel 20 is a member of the design unit 210. As the holding frame 221 is fixed to the design frame 50, the distance between the cover panel 20 and the display surface 13 of the display unit 10 is determined. In this case, since the distance between the cover panel 20 and the display surface 13 of the display unit 10 may vary depending on every display device 200, it is difficult to equally apply the optical adhesive 14 between the cover panel 20 and the display surface 13 in each display device 200.

Problem 2 of First Comparative Example

Further, in the first comparative example, it is necessary to wait until the optical adhesive 14 is cured after the fabrication. Therefore, the method of the first comparative example is not suitable for mass production.

Problem 3 of First Comparative Example

In addition, when a plurality of variations occur in the shape of the design frame 50, a coating facility matching the shape of the design frame 50 is necessary for each variation. Therefore, the versatility of the facility is low.

Problem 4 of First Comparative Example

In the first comparative example, when the cover panel 20 and the display unit 10 are bonded to each other by the optical adhesive 14, the design frame 50 has been already connected to the cover panel 20, and the holding frame 221 has been already connected to the display unit 10. Therefore, foreign matter is likely to easily enter between the display surface 13 of the display unit 10 and the cover panel 20. Further, when the entry of the foreign matter has been found, the display device 200 was already assembled. Therefore, if the foreign matter entered, the entire display device 200 must be discarded.

Problem 5 of First Comparative Example

In order to prevent display unevenness, it is necessary to finish the screw tightening before the optical adhesive 14 is cured. In the first comparative example, therefore, the process procedure is greatly restricted.

Second Comparative Examine

Figure 17:
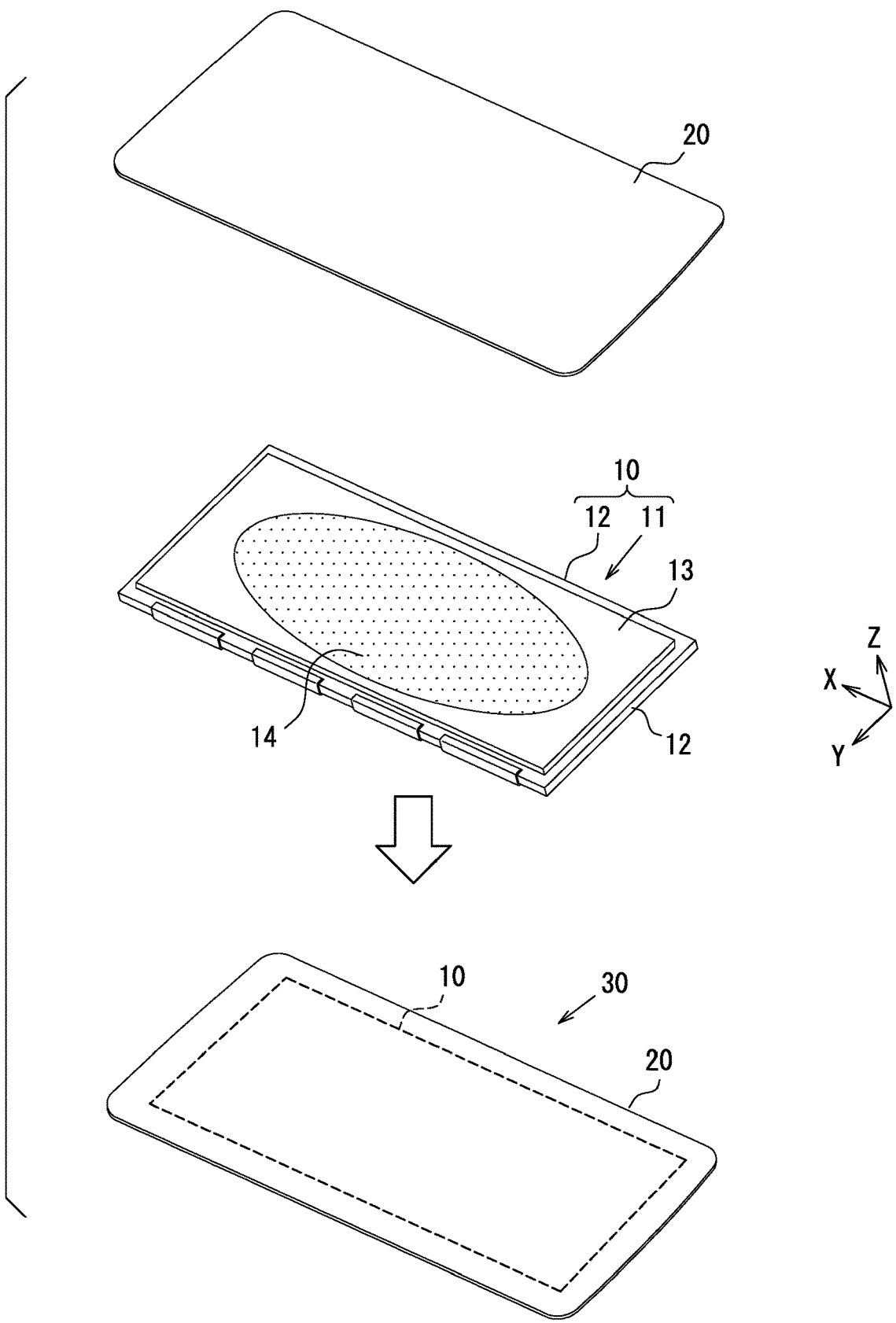
FIG. 17 is a diagram for explaining a panel bonding step in a second comparative example.
Figure 18:
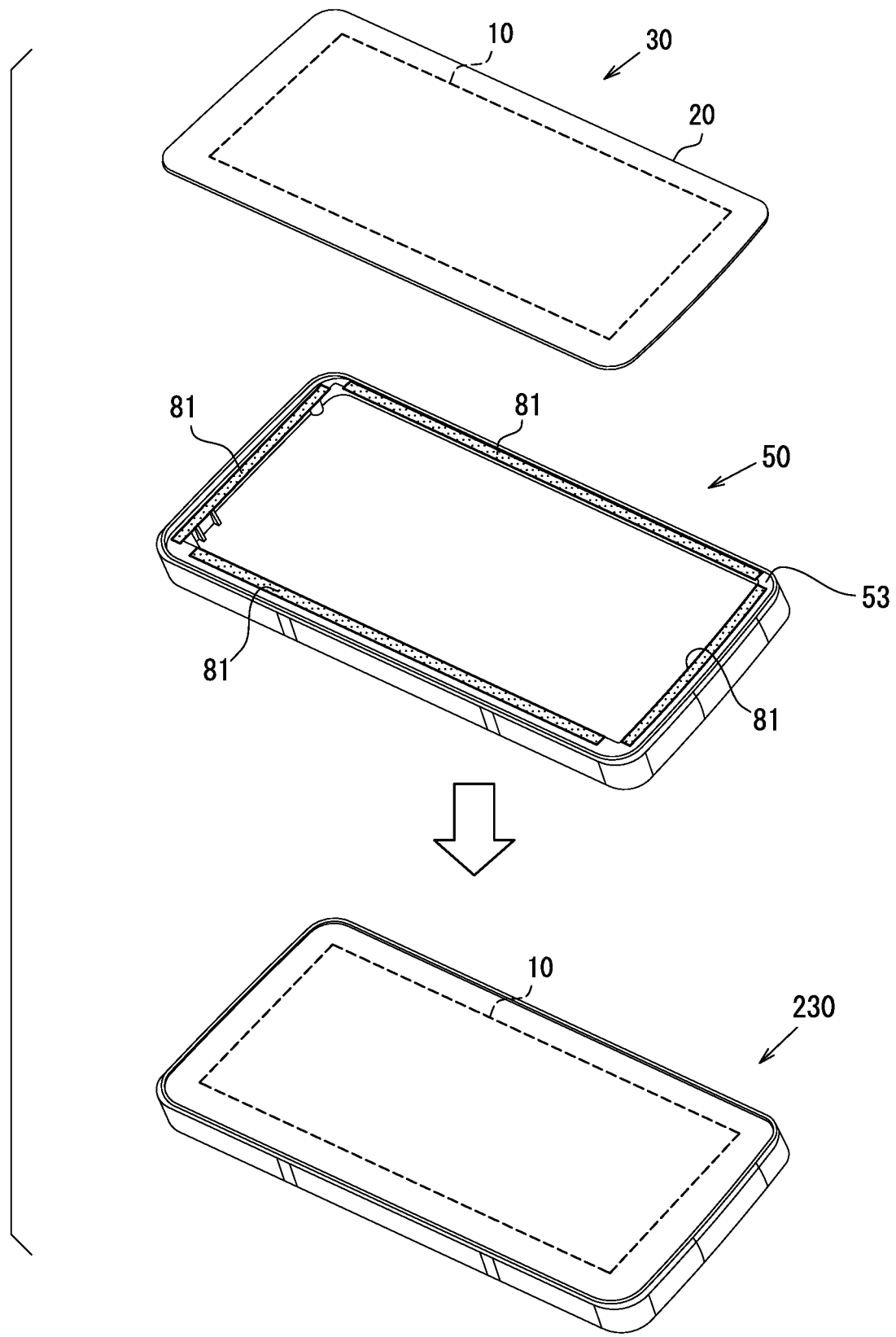
FIG. 18 is a diagram for explaining an assembling step of a frame-connected display unit in the second comparative example.

Next, a second comparative example will be described. In the second comparative example, as shown in FIG. 17, the panel bonding step S1 of the embodiment described above is carried out to produce the panel-bonded display unit 30. Next, as shown in FIG. 18, the panel-bonded display unit 30 is connected to the design frame 50, to thereby produce a frame-connected display unit 230.

Figure 19:
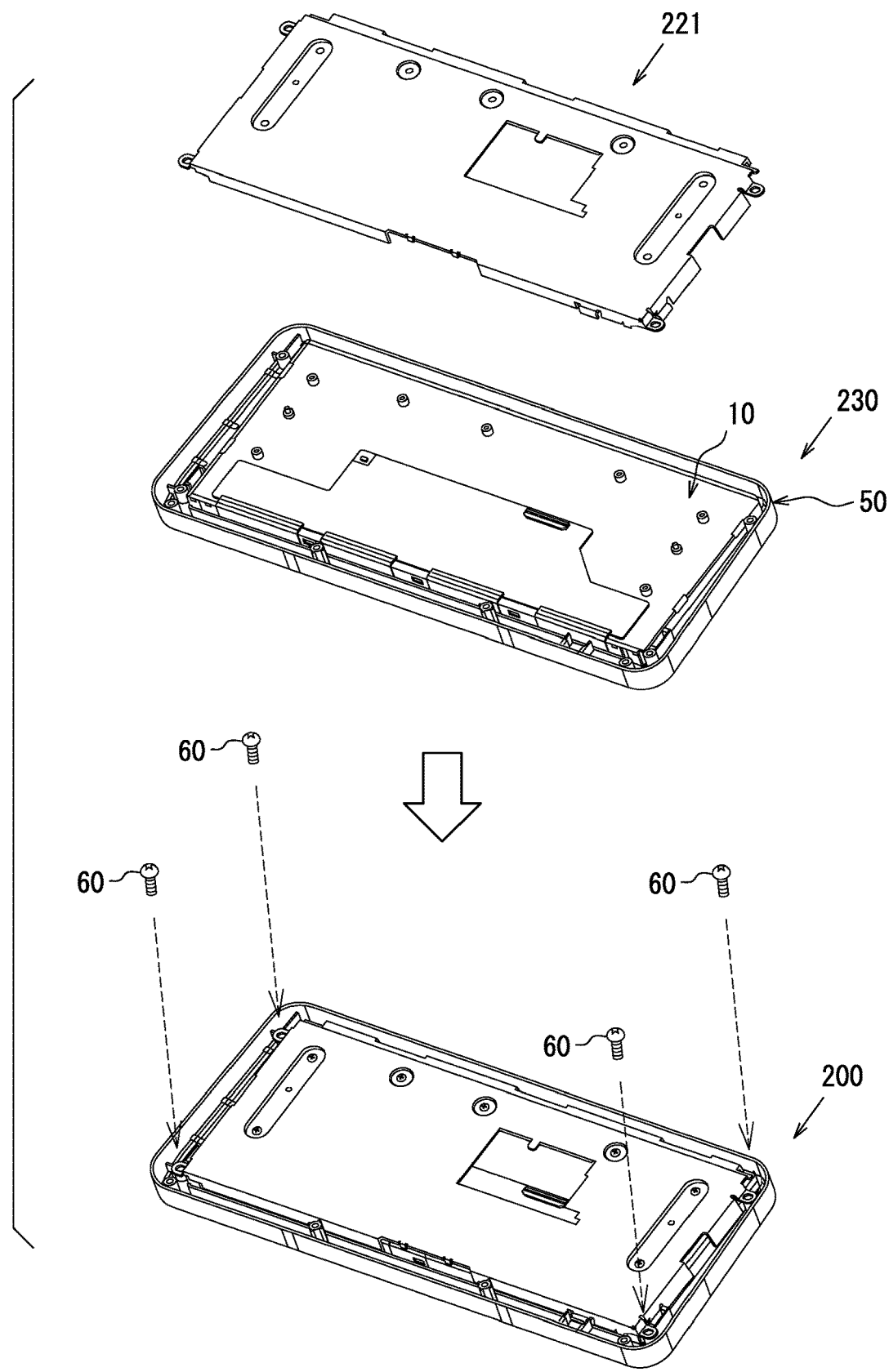
FIG. 19 is a diagram for explaining a completing step of a display device in the second comparative example.

Then, as shown in FIG. 19, a holding frame 221 is attached to the frame-connected display unit 230 with the screws 60, to thereby produce a display device 200. Specifically, the holding frame 221 and the display unit 10 are connected to each other by the screws 60, and the holding frame 221 and the design frame 50 are also connected to each other by the screws 60. In FIG. 19, the frame-connected display unit 230 is shown on the back side, which is the opposite side shown in FIG. 18.

In the fabrication method shown in the second comparative example, the panel-bonded display unit 20 is produced similarly to the embodiment described above. In the panel-bonded display unit 30, the cover panel 20 and the display unit 10, which are not bonded to other members, that is, which are sole members, are bonded to each other with the optical adhesive 14. Therefore, differently from the first comparative example, the distance between the cover panel 20 and the display unit 10 is not limited by the connection with other members. Therefore, the problem 1 raised in the first comparative example does not occur.

Further, since the panel-bonded display unit 30 can be produced in advance, the time to wait until the optical adhesive 14 is cured after the fabrication can be reduced or such time not necessary. That is, in the second comparative example, the problem 2 raised in the first comparative example is solved.

Further, since the cover panel 20 and the display unit 10, which are not bonded to other members, are bonded to each other by the optical adhesive 14, it is possible to suppress an increase in the size of the bonding equipment. Further, even if there are variations in the shapes of the cover panel 20 and the display unit 10, since the cover panel 20 and the display unit 10 are only bonded to each other, a plurality of types of panel-bonded display unit 30 can be manufactured by the same manufacturing equipment. Even if there are a plurality of variations in the shape of the design frame 50, since the cover panel 20 and the display unit 10 are bonded together without the design frame 50, it is not necessary to prepare a dispensing facility that matches the shape of the design frame 50. That is, in the second comparative example, the problem 3 raised in the first comparative example is also solved.

Further, since the cover panel 20 and the display unit 10, which are not bonded to other members, are bonded to each other by the optical adhesive 14, there is little risk of foreign matter being mixed. Further, at the stage of the panel-bonded display unit 30 being produced, it is possible to confirm whether the cover panel 20 and the display unit 10 are bonded evenly and without entry of the foreign matter. Therefore, even if there is uneven adhesion or foreign matter has entered, only the panel-bonded display unit 30 is discarded. As such, the deterioration of the yield can be suppressed. That is, in the second comparative example, the problem 4 raised in the first comparative example is solved. Further, since it is not necessary to perform the tightening the screws and the application of the optical adhesive 14 at the same time, the problem 5 raised in the first comparative example does not occur. In the second comparative example 2, since the panel-bonded display unit 30 is produced in the manner described above, the problems 1 to 5 raised in the first comparative example are all solved.

Problem 1 of Second Comparative Example

However, differently from the embodiment described above, the design frame 50 is attached to the panel-bonded display unit 30 to form the frame-connected display unit 230, before the holding frame 221 is connected. Since the design frame 50 alone is not sufficiently rigid, the design frame 50 may be deformed. If the design frame 50, which is deformed, is attached to the panel-bonded display unit 30, stress is also generated in the cover panel 20 due to the deformed design frame 50. The stress generated in the cover panel 20 results in the display unevenness.

Problem 2 of Second Comparative Example

Further, when the holding frame 221 is connected to the display unit 10 by the screws 60, the display unit 10 is deformed along the shape of the holding frame 221. Due to the deformation of the display unit 10, stress is also generated in the optical adhesive 14 that bonds the display unit 10 and the cover panel 20 to each other. As a result, the display unevenness may occur. Further, when the holding frame 221 and the design frame 50 are connected to each other by the screws 60, the design frame 50 is also deformed along the shape of the holding frame 221. Since the design frame 50 is bonded to the cover panel 20, when the design frame 50 is deformed, the cover panel 20 is deformed. When the cover panel 20 is deformed, stress is also generated in the optical adhesive 14 that bonds the display unit 10 and the cover panel 20 to each other. This may also result in the display unevenness.

Summary of Embodiment

As described above, the display device 200 in which the holding frame 221 and the display unit 10 are connected by the screws 60 has the problems described above, regardless of which of the manufacturing methods of the first comparative example and the second comparative example is used.

On the other hand, in the display device 100 of the present embodiment, the holding frame 40 and the display unit 10 are bonded to each other with the adhesive agent 80. Therefore, the stress applied from the holding frame 40 to the display unit 10 at the time of bonding can be greatly reduced, as compared with the display device 200 of the first and second comparative examples in which the holding frame 221 and the display unit 10 are connected by the screws 60. As a result, even if the display unit 10 and the cover panel 20 are bonded to each other in advance with the optical adhesive 14, the stress that is caused in the display unit 10 by bonding the display unit 10 and the holding frame 40 and results in displacing the optical adhesive 14 can be reduced. Therefore, an occurrence of the display unevenness can be suppressed. That is, in the display device 100 of the present embodiment, the problem 2 of the second comparative example is solved even if the panel-bonded display unit 30 is produced in the panel bonding step S1 as in the second comparative example.

Moreover, since the panel-bonded display unit 30 is produced, the problems 1 to 5 raised in the first comparative example do not occur, as described in the second comparative example.

Further, the design frame 50 and the holding frame 40 are connected to each other to produce the housing unit 70. Even if the design frame 50 alone has low rigidity and may have deformation, the deformation of the design frame 50 can be corrected by being connected with the holding frame 40, before the design frame 50 is bonded with the panel-bonded display unit 30. As a result, when the housing unit 70 and the panel-bonded display unit 30 are bonded to each other, the stress applied from the design frame 50 to the panel-bonded display unit 30 is reduced. That is, in the display device 100 of the present embodiment, even if the panel-bonded display unit 30 is produced in the panel bonding step S1 as in the second comparative example, the problem 1 raised in the second comparative example is also solved.

In the present embodiment, since the panel facing surface 53 of the design frame 50 and the cover panel 20 are adhered with the elastic adhesive tape 81, the force applied from the design frame 50 to the cover panel can be relaxed. In this respect as well, the force applied to the bonded portion by the optical-bonding is reduced, so that the display unevenness is suppressed.

In the present embodiment, since the adhesive agent 80 is not applied to the plurality of protrusions 43, the plurality of protrusions 43 come into contact with the panel-bonded display unit 30 in the state where the display device 100 is assembled. Therefore, the thickness of the adhesive agent 80 is determined by the heights of the plurality of protrusions 43. Even if the thickness of the adhesive agent 80 applied to the adhesive surface 44 is thicker than the height of the protrusion 43, the thickness is adjusted later. That is, when the housing unit 70 is placed under the panel-bonded display unit 30 and the panel-bonded display unit 30 is moved down toward the housing unit 70 for bonding, the adhesive agent 80 is deformed by the weight of the panel-bonded display unit 30, so that the thickness of the adhesive agent 80 can be easily made constant. Since the thickness of the adhesive agent 80 affects the adhesive strength, the housing unit 70 and the panel-bonded display unit 30 can be firmly bonded to each other without using a large amount of the adhesive agent 80.

In the present embodiment, the display unit 10 includes a liquid crystal panel 11. The liquid crystal panel 11 is heavier than the organic EL panel, which is another example of the display panel. Therefore, when the housing unit 70 and the panel-bonded display unit 30 are bonded to each other with the adhesive agent 80 in the state where the panel-bonded display unit 30 is placed on top of the housing unit 70, the housing unit 70 and the panel-bonded display unit 30 are firmly bonded to each other.

In the present embodiment, when the housing unit 70 and the panel-bonded display unit 30 are connected to each other, the adhesive agent 80 is applied to the holding frame 40, and the elastic adhesive tape 81 is attached to the design frame 50. Since the adhesive agent 80 and the elastic adhesive tape 81 are applied or adhered to surfaces both facing the panel-bonded display unit 30 and existing in close proximity to each other, the workability is improved.

Although the embodiment of the present disclosure has been described above, the present disclosure is not limited to the embodiment described hereinabove, and various modified examples described below are also included in the technical scope of the present disclosure. Furthermore, various modifications other than the following can be made without departing from the gist of the present disclosure.

First Modification

In the embodiment described above, the design frame 50 and the holding frame 40 are exemplarily connected to each other by the screws 60. Alternatively, the design frame 50 and the holding frame 40 may be connected to each other by an engagement structure, such as a claw fitting mechanism having a claw portion and a recess fitting each other.

Second Modification

In the embodiment described above, the protrusions 43 are formed as a projection portion for adjusting the application thickness of the adhesive agent 80. However, the member for adjusting the application thickness of the adhesive agent 80 is not limited to the protrusions 43, and protrusions having any other shapes, which are so-called rib or boss may be employed.

Third Modification

In the embodiment described above, the holding frame 40 has the four protrusions 43. However, the number of protrusions 43 is not limited to four. The holding frame 40 may have two or more protrusions.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display device comprising:
   a display unit having a display surface to display an image, and a back surface opposite to the display surface;
   a cover panel stacked on the display surface of the display unit; and
   a holding frame stacked on the back surface of the display unit, the holding frame having a central portion facing the display unit and holding the display unit, wherein
   the display surface of the display unit and the cover panel are bonded to each other with an optical adhesive material,
   the holding frame and the display unit are bonded to each other with a variable thickness adhesive material a thickness of which is variable at least at a time of bonding the holding frame and the display unit,
   the variable thickness adhesive material includes an adhesive agent,
   the holding frame has an adhesive surface facing the display unit and on which the adhesive agent is adhered, and a plurality of projection portions projecting from the adhesive surface toward the display unit, and
   the adhesive agent bonds the adhesive surface of the holding frame and the display unit to each other at positions other than the projection portions, and the projection portions are in contact with the display unit.

2. The display device according to claim 1, further comprising:

a design frame fixed to the holding frame and covering a side surface of the display unit, and an end surface of the design frame facing the cover panel is bonded to the cover panel with the variable thickness adhesive material.

3. The display device according to claim 1, wherein the display unit includes a liquid crystal panel.

4. A method for manufacturing a display device, comprising:

bonding a cover panel to a display surface of a display unit with an optical adhesive material to produce a panel-bonded display unit;

connecting a holding frame and a design frame to each other to produce a housing unit; and integrating the panel-bonded display unit and the housing unit by bonding the holding frame of the housing unit and the display unit of the panel-bonded display unit with a variable thickness adhesive material a thickness of which is variable, wherein a central portion of the holding frame faces the display unit to hold the display unit, and the design frame covers a side surface of the display unit, the variable thickness adhesive material is an adhesive agent, the holding frame has an adhesive surface facing the display unit and on which the adhesive agent is adhered, and a plurality of projection portions projecting from the adhesive surface toward the display unit, and in the integrating, the adhesive agent is applied to an area between the projection portions on the adhesive surface of the holding frame, and the panel-bonded display unit is bonded on the housing unit in a state where the housing unit is placed under the panel-bonded display unit, after the adhesive agent is applied.

5. The method according to claim 4, wherein in the integrating, the cover panel and an end surface of the design frame facing the cover panel are bonded to each other with the variable thickness adhesive material.

6. The method according to claim 4, wherein in the integrating, the housing unit and the panel-bonded display unit are bonded to each other after the variable thickness adhesive material is adhered to the holding frame and the design frame.

7. The method according to claim 4, wherein the display unit includes a liquid crystal panel.

* * * * *